United States Patent
Wang

(10) Patent No.: US 9,912,373 B1
(45) Date of Patent: Mar. 6, 2018

(54) TECHNIQUES TO DETECT ECHOES USING AUDIO FINGERPRINTING

(71) Applicant: WhatsApp Inc., Mountain View, CA (US)

(72) Inventor: YuanYuan Wang, Sunnyvale, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

(21) Appl. No.: 15/298,216

(22) Filed: Oct. 19, 2016

(51) Int. Cl.
H04B 3/23 (2006.01)
H04M 7/00 (2006.01)

(52) U.S. Cl.
CPC .............. *H04B 3/23* (2013.01); *H04M 7/006* (2013.01)

(58) Field of Classification Search
CPC ............ G10L 21/0205; G10L 21/0208; G10L 21/0364; G10L 21/12; H04B 3/23; H04M 7/006; H04M 3/002; H04N 21/44218
USPC .......... 348/241; 370/201; 379/32.01, 406.04, 379/406.06, 284, 406.08; 455/115.1; 704/205, 211, 226, 500; 375/222, 227; 709/218; 725/12
See application file for complete search history.

(56) References Cited

U.S. PATENT DOCUMENTS

| | | | | |
|---|---|---|---|---|
| 6,504,865 B1 * | 1/2003 | Liang | ................. | H04L 25/4927 375/216 |
| 6,826,279 B1 * | 11/2004 | Alavi | .................... | H04M 9/082 379/406.01 |
| 7,995,745 B1 * | 8/2011 | Parry | ................... | H04M 9/082 379/406.04 |
| 8,755,515 B1 * | 6/2014 | Wu | ...................... | H04M 11/066 379/284 |
| 9,666,208 B1 * | 5/2017 | Rubin | .................... | G10L 21/12 |
| 2006/0168114 A1 * | 7/2006 | Glatron | ........... | G11B 20/10527 709/218 |
| 2008/0177534 A1 * | 7/2008 | Wang | .................. | H04M 3/002 704/211 |
| 2011/0002458 A1 * | 1/2011 | Czyzewski | ............ | H04B 3/234 379/406.06 |
| 2012/0050582 A1 * | 3/2012 | Seshadri | ............ | H04N 13/0018 348/241 |
| 2012/0250830 A1 * | 10/2012 | Lam | ........................ | H04M 3/56 379/32.01 |
| 2012/0287769 A1 * | 11/2012 | Saleem | ................. | H04M 9/082 370/201 |
| 2013/0005285 A1 * | 1/2013 | Yin | ...................... | H04B 17/009 455/115.1 |
| 2013/0230086 A1 * | 9/2013 | Sorensen | .............. | H04B 7/015 375/227 |

(Continued)

*Primary Examiner* — Gerald Gauthier

(57) ABSTRACT

Techniques to detect echoes using audio fingerprinting are described. In one embodiment, an apparatus may comprise a streaming component operative to establish a audio connection between the first client device and a second client device; and receive a far-end audio stream at the first client device from the second client device via the audio connection; an audio capture component operative capture a near-end audio stream at the first client device; and an echo processing component operative to compare the near-end audio stream and the far-end audio stream to determine whether a far-end audio segment is present in the near-end audio stream; and use an echo-cancellation module at the first client device where the far-end audio segment is present in the near-end audio stream. Other embodiments are described and claimed.

20 Claims, 10 Drawing Sheets

(56) References Cited

U.S. PATENT DOCUMENTS

| | | | |
|---|---|---|---|
| 2014/0133648 A1* | 5/2014 | Czyzewski | H04M 9/082 |
| | | | 379/406.08 |
| 2015/0081311 A1* | 3/2015 | Haywood | G10L 19/018 |
| | | | 704/500 |
| 2015/0156543 A1* | 6/2015 | Allegretti | H04N 21/44218 |
| | | | 725/12 |
| 2015/0221319 A1* | 8/2015 | Cartwright | G10L 19/008 |
| | | | 704/205 |
| 2016/0125892 A1* | 5/2016 | Bowen | G10L 15/20 |
| | | | 704/226 |
| 2016/0225385 A1* | 8/2016 | Hammarqvist | G10L 21/0208 |
| 2017/0098453 A1* | 4/2017 | Wright | G10L 21/0205 |
| 2017/0103774 A1* | 4/2017 | Sorensen | G10L 21/0232 |
| 2017/0171380 A1* | 6/2017 | Singh | H04M 3/002 |

* cited by examiner

TECHNIQUES TO DETECT ECHOES USING AUDIO FINGERPRINTING

RELATED APPLICATIONS

This application is related to U.S. patent application Ser. No. 14/963,374, titled "Techniques to Dynamically Engage Echo Cancellation," filed on Dec. 9, 2015, which is hereby incorporated by reference in its entirety.

BACKGROUND

Users of mobile devices, such as smartphones, may use their mobile devices to execute applications. These applications may perform communications and network tasks on behalf of their user. An application may comprise a messaging client for communication between users. This communication may include the transmission of streaming content, including streaming audio content such as a voice-over-Internet-Protocol (VoIP) communication exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to detect echoes using audio fingerprinting. Some embodiments are particularly directed to techniques to detect echoes using audio fingerprinting for the dynamic engagement of echo cancellation.

In one embodiment, for example, an apparatus may comprise a streaming component operative to establish a audio connection between the first client device and a second client device; and receive a far-end audio stream at the first client device from the second client device via the audio connection; an audio capture component operative capture a near-end audio stream at the first client device; and an echo processing component operative to compare the near-end audio stream and the far-end audio stream to determine whether a far-end audio segment is present in the near-end audio stream; and use an echo-cancellation module at the first client device where the far-end audio segment is present in the near-end audio stream. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
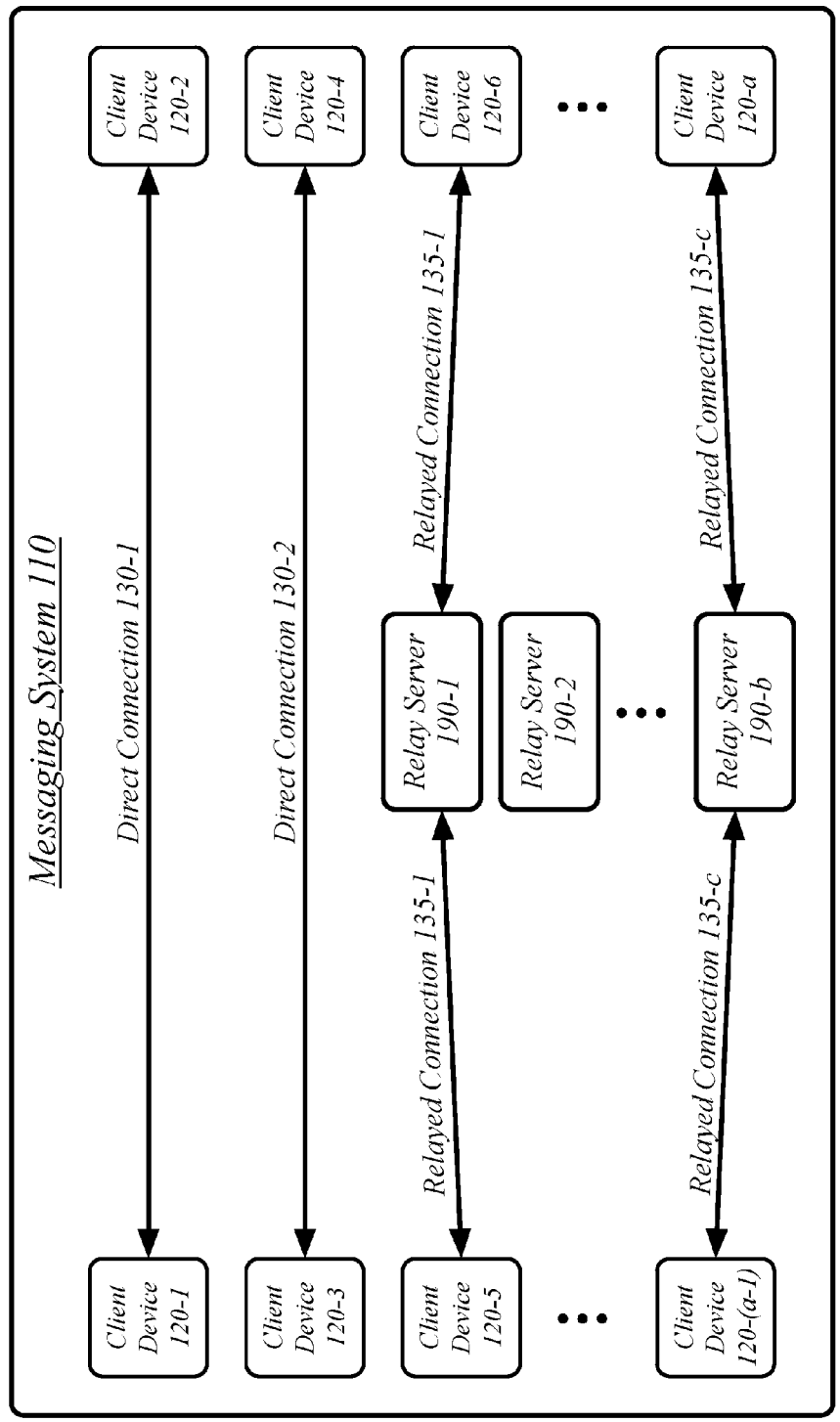
FIG. 1 illustrates an embodiment of a streaming audio system.

Bi-directional audio connections between devices, whether a traditional telephone connection, a voice over internet protocol (VoIP) connection, or other audio connection may be performed in an environment in which the playback of received audio by a playback device may be perceived and recorded by an audio capture device. If this recording of the playback of the received audio is then incorporated back into the audio connection, it may be perceived as an echo by the original sender of the received audio or by any other participant in the audio connection. This echo may be undesirable.

Echo-cancellation techniques may be used to remove or reduce the presence of such an echo. Where an echo is present in captured audio, these echo-cancellation techniques may improve the perceived quality of the audio connection. However, where no echo is present in the captured audio, the use of echo-cancellation techniques may serve to lower the perceived quality of the audio connection. Echo-cancellation techniques may introduce distortion into a processed audio signal. Where an echo is present, the disadvantage of this distortion may be less than the advantage of echo-cancellation. However, where no echo is present, no positive benefit is received from echo cancellation, leaving only the distortion and therefore a reduced perceived audio quality. This may particularly be the case where software echo-cancellation techniques are used that may introduce greater distortion than hardware echo-cancellation techniques and most particularly the case on devices with limited processing resources that may only be able to use low-processing resource software echo-cancellation techniques.

As such, the perceived quality of an audio connection may be improved by dynamically engaging and disengaging echo cancellation based on whether an echo is present in the captured audio signal. An audio communication application may monitor captured audio signals for the presence of an echo, use echo-cancellation where an echo is detected, and refrain from using echo-cancellation where no echo is detected. As such, an audio communication application may improve the quality of audio connections for users over implementations that either continuously use or continuously refrain from using echo-cancellation techniques.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a streaming audio system 100. In one embodiment, the streaming audio system 100 may comprise a computer-implemented system having software applications comprising one or more components. Although the streaming audio system 100 shown in FIG. 1 has a limited number of elements in a certain topology, it may be appreciated that the streaming audio system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls.

A plurality of client devices 120 may operate as part of the streaming audio system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Streaming network connections within the messaging system 110 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the messaging system 110, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Streaming audio system 100 may include an authorization server (or other suitable component(s)) that allows users to opt in to or opt out of having their actions logged by streaming audio system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of streaming audio system 100 and other elements of a messaging system through blocking, data hashing, anonymization, or other suitable techniques as appropriate. For instance, a user may be empowered to configure privacy settings determining whether network usage, such as streaming communication, is logged by the streaming audio system 100 and analyzed. In some embodiments, a user may be presented with information regarding may be collected and how that information may be used, such as informing the user that collected information may be anonymized prior to analysis.

Figure 2:
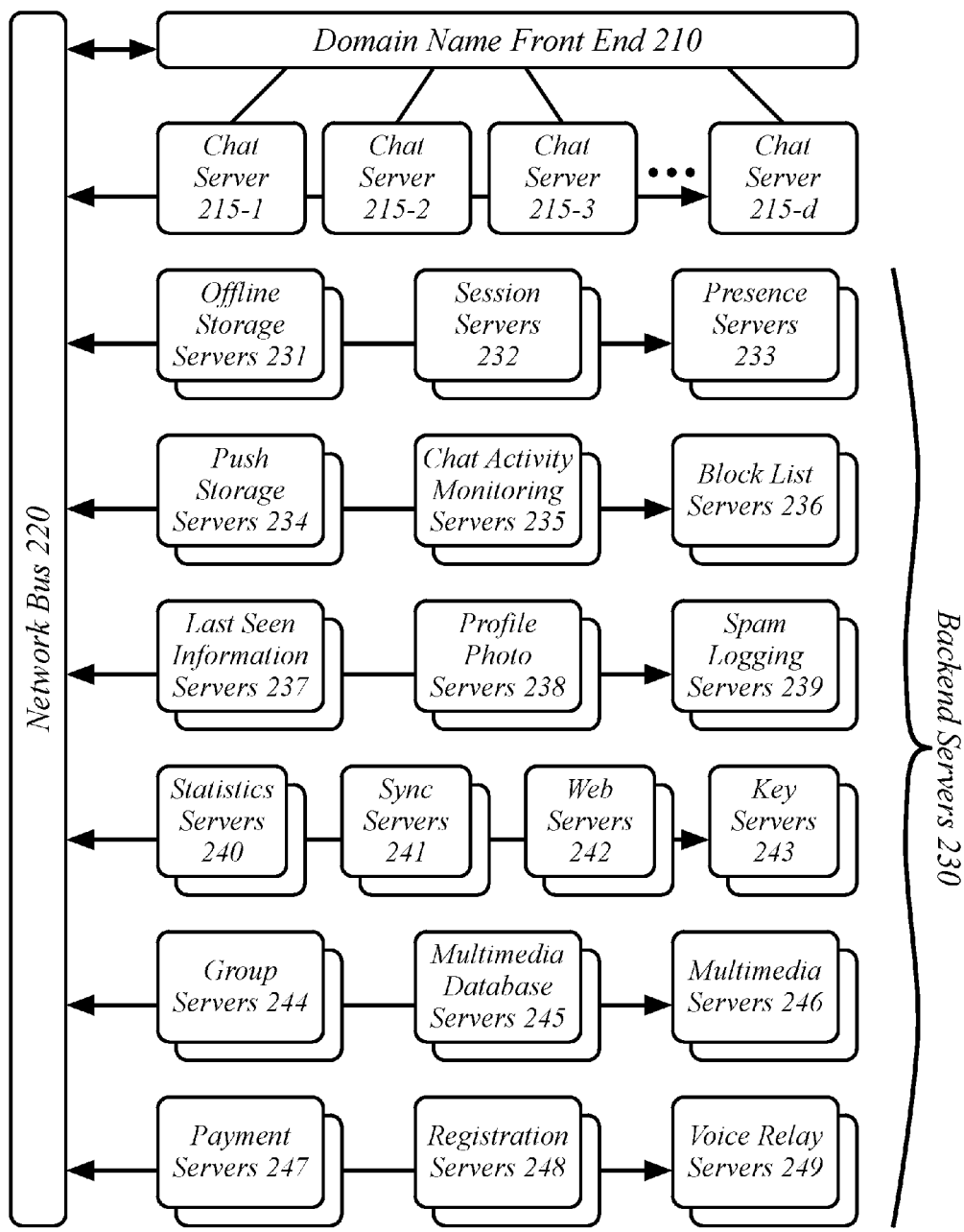
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming audio system 100 with the operations of the streaming audio system 100 comprising a portion of the overall operations of the messaging system 200. The illustrated embodiment of the messaging system 200 may particularly correspond to a portion of the messaging system 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
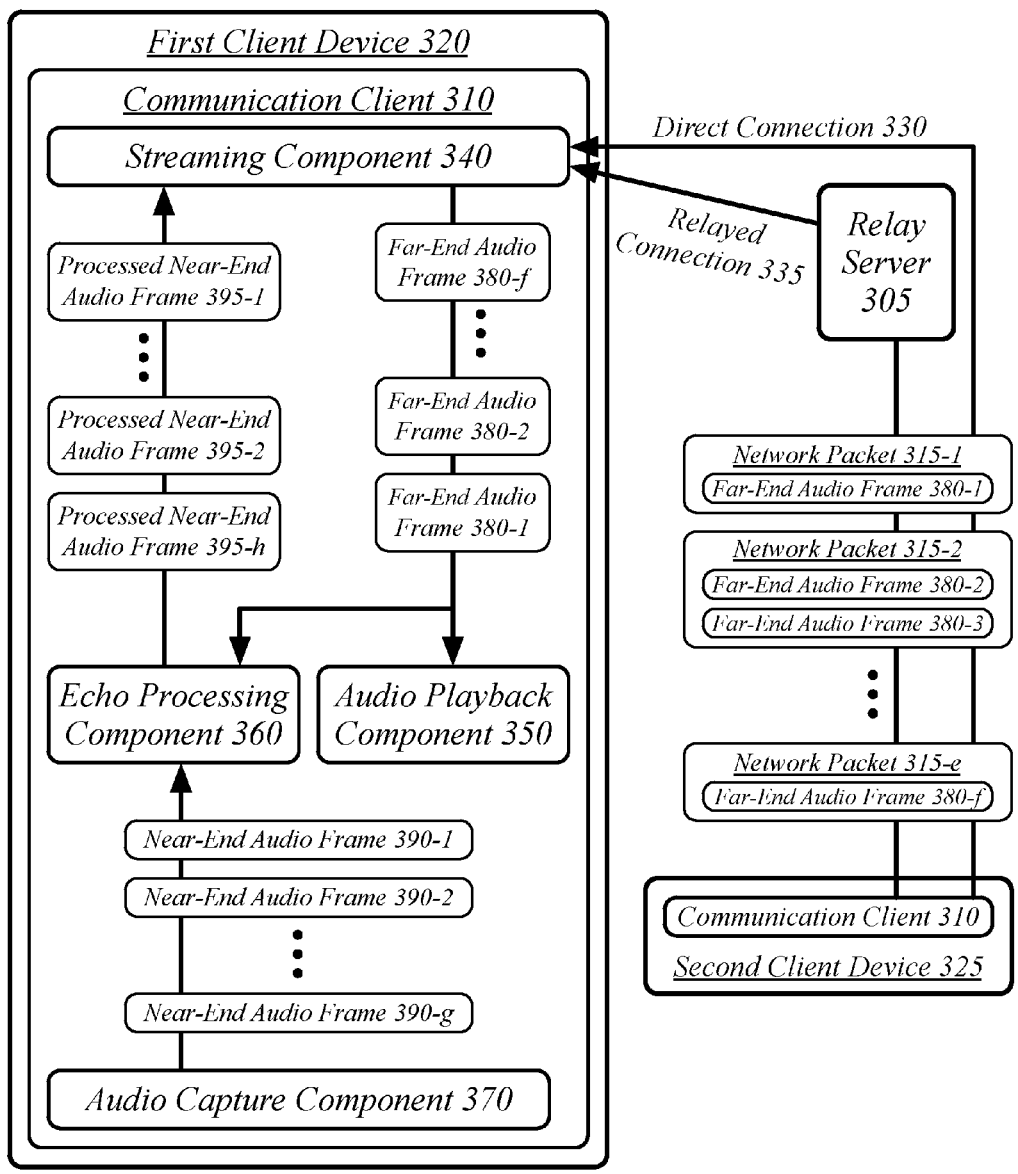
FIG. 3 illustrates an embodiment of near-end audio frames being processed.

FIG. 3 illustrates an embodiment of near-end audio frames being processed.

A first client device 320 may engage in a streaming network connection with a second client device 325. Each of the first client device 320 and second client device 325 may execute an instantiation of a communication client 310. In some cases, the client devices 320, 325 may execute instantiations of different communication clients that conform to a sufficiently common specification to empower interoperability. In some embodiments, the communication client 310 may comprise a messaging client offering audio streaming communication services.

In some cases, the streaming network connection may be a direct connection 330 in which the outgoing network packets from the first client device 320 are addressed to the public-facing address associated with the second client device 325 and the outgoing network packets from the second client device 325 are addressed to the public-facing address associated with the first client device 320. In other cases, the streaming network connection may be a relayed connection 335 in which the outgoing network packets from the first client device 320 and second client device 325 are addressed to a relay server 305, with the relay server 305 operative to forward network packets received from one client device to the other client device. A relay server 305 may comprise one relay server of a plurality of relay servers 190 provided as part of a messaging system 110.

A communication client 310 may comprise a streaming component 340, the streaming component generally arranged to establish and carry out the performance of a streaming network connection carrying streaming media content as a media stream. The streaming network connection may comprise a sequence of network packets 315. A network packet may comprise a user datagram protocol (UDP) or transmission control protocol (TCP) addressed using the internet protocol (IP), thereby forming UDP/IP or TCP/IP packets. In some embodiments, UDP/IP may be preferentially used as it may be preferable to miss a packet than introduce the additional delay of requesting and receiving a replacement to a missed packet.

The streaming component 340 may be operative to receive a plurality of network packets 315, wherein each of the plurality of network packets 315 comprises one or more far-end audio frames 380. The streaming component 340 may be operative to extract the far-end audio frames 380 from the network packets 315 and pass the far-end audio frames 380 to both an echo-processing component 360 and an audio playback component 360. A media frame may comprise an encoded portion of a media stream covering a predefined length of time, wherein playback of the far-end audio frames 380 in sequences produces a media playback of a live-recorded media event, such as a voice call. In some embodiments, the communication client 310 may comprise a media buffer component operative to buffer frames prior to playback and/or prior to transmission by the streaming component 340.

The communication client 310 may comprise an audio playback component 350, the audio playback component 350 generally arranged to playback a far-end audio stream. The audio playback component 350 may be generally arranged to decode the audio frames 380 and play the audio content comprised within the far-end audio frames 380 for the user of the first client device 320. The audio playback component 350 may iteratively request a next audio frame of the far-end audio frames 380, receive an audio frame, and play back the audio frame. The audio playback component 350 may play the audio content through one or more speakers of the first client device 320, one or more audio output ports of the first client device 320, or using any other hardware devices of the first client device 320. The audio playback component 350 may decode the audio content using one or more known codecs, standards, or formats. The audio playback component 350 may generally decode and play audio content using known techniques for audio decoding and/or audio playback.

The communication client 310 may comprise an audio capture component 370, the audio capture component 370 generally arranged to capture audio content as a near-end audio stream. A near-end audio stream may comprise the digitally-encoded stream corresponding to the capture of an audio signal by an audio capture device. The audio capture component 370 may be generally arranged to capture a near-end audio stream and to encode the near-end audio stream as a plurality of near-end audio frames 390. The audio capture component 370 may iteratively generate near-end audio frames 390 and forward the near-end audio frames 390 to an echo processing component 360 for eventual forwarding, after echo processing, to a streaming component 340 for transmission to the second client device 325. The audio capture component 370 may capture the audio content through one or more microphones of the first client device 320, one or more audio input ports of the first client device 320, or using any other hardware devices of the first client device 320. The audio capture component 370 may encode the audio content using one or more known codecs, standards, or formats. The audio capture component 370 may generally capture and encode audio content using known techniques for audio capture and/or audio encoding.

The communication client 310 may comprise an echo processing component 360, the echo processing component 360 generally arranged to perform echo processing for the captured audio of the communication client 310. The echo processing component 360 may compare the near-end audio frames 390 with the far-end audio frames 380 to determine whether the playback of the far-end audio stream by the audio playback component 350 is present in the near-end audio frames 390 captured by the audio capture component 370. The echo processing component 360 may dynamically engage echo-cancellation techniques where an echo is detected. The echo processing component may generate processed near-end audio frames 395, wherein the processed near-end audio frames 395 were subject to echo-cancellation where an echo was detected by the echo processing component 360 and were not subject to echo-cancellation where an echo was not detected by the echo processing component 360. The generated processed near-end audio frames 395 may be passed to the streaming component 340 for transmission to the second client device 325.

While the illustrated embodiment depicts a two-party audio connection it will be appreciated that more than two client devices may be engaged in an audio connection and that the techniques described herein may be applied to multi-party audio connections. For instance, far-end audio frames 380 may be received from two or more devices and played using the audio capture component 370. The near-end audio frames 390 may be compared to the combined audio content played by the audio playback component 350 to determine if an echo is present and to generate the processed near-end audio frames 395. The streaming component 340 may, similarly, transmit the processed near-end audio frames 395 to a plurality of other client devices.

Figure 4:
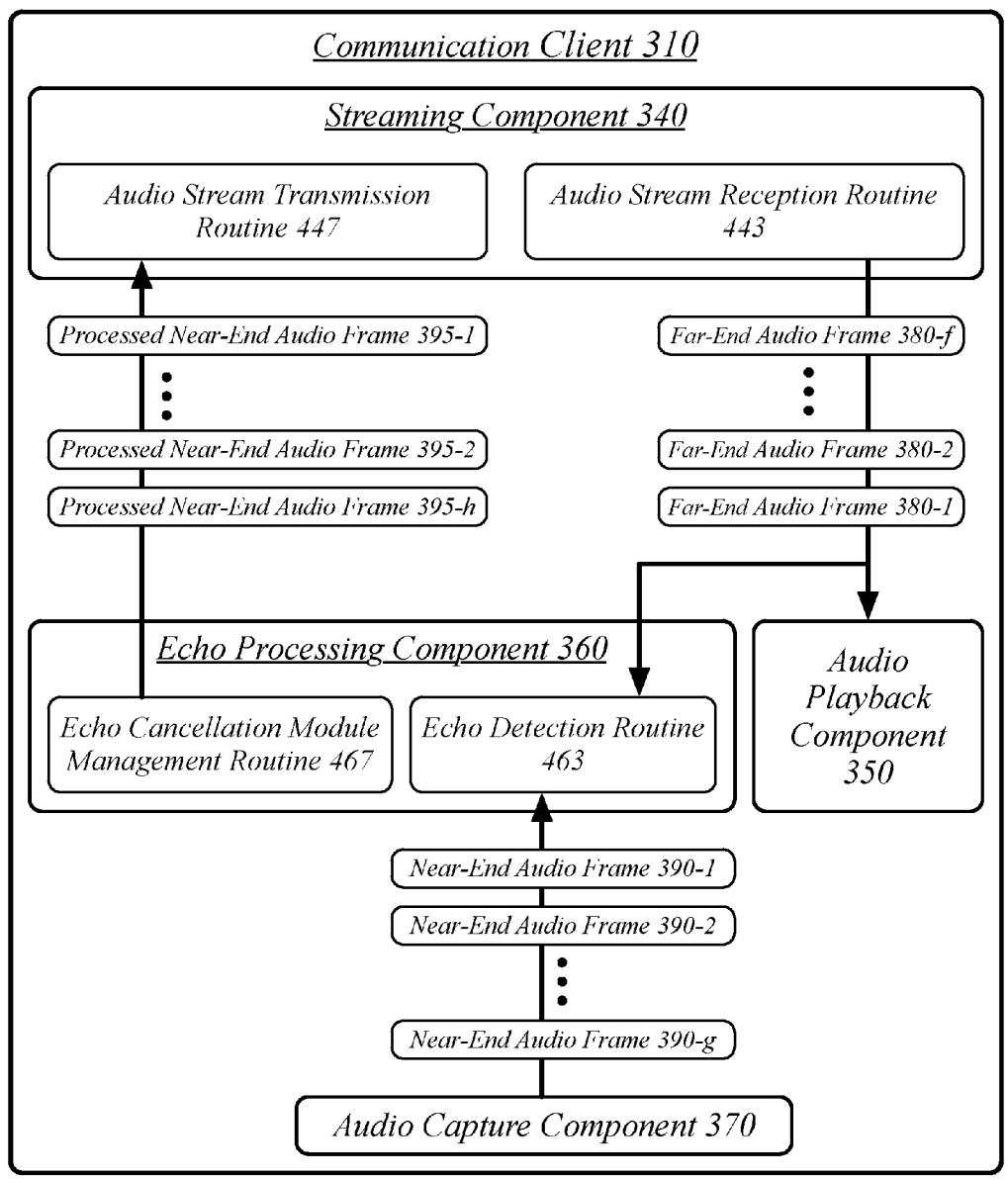
FIG. 4 illustrates an embodiment of a streaming component and an echo processing component.

FIG. 4 illustrates an embodiment of a streaming component 340 and an echo processing component 360. The streaming component 340 and the echo processing component 360 may comprise one or more routines, the one or more routines comprising a sequence of instructions operative on a processor circuit to perform one or more tasks in the performance of the operations of the components 340, 360.

The streaming component 340 may comprise an audio stream reception routine 443. The audio stream reception routine 443 may be operative to establish an audio connection between a first client device 320 and a second client device 325. Establishing an audio connection may correspond to initiating a streaming audio connection with the second client device 325 and/or a relay server 305. Establishing an audio connection may correspond to receiving a request to initiate a streaming audio connection from a second client device 325 and/or a relay server 305 being used by the second client device 325. Establishing an audio connection may correspond to performing a request-and-response sequence with the second client device 325. Alternatively, establishing an audio connection may comprise establishing a telephonic audio connection between the first client device 320 and the second client device 325, which may be initiated by either of the first client device 320 or second client device 325. In some embodiments, establishing an audio connection may comprise sending and receiving data via a network interface controller.

The audio stream reception routine 443 may be operative to receive a far-end audio stream at the first client device 320 from the second client device 325 via the audio connection. The far-end audio stream may comprise a plurality of far-end audio frames 380. The audio stream reception routine 443 may pass the far-end audio frames 380 to an echo detection routine 463 of the echo processing component 360 and to an audio playback component 350.

An audio stream transmission routine 447 may receive a processed near-end audio signal from the echo processing component 360. The processed near-end audio signal may comprise a plurality of processed near-end audio frames 395. The audio stream transmission routine 447 may transmit the plurality of processed near-end audio frames 395 to the second client device 325.

An echo processing component 360 may comprise an echo cancellation detection routine 463. The echo cancellation detection routine 463 may compare the near-end audio stream and the far-end audio stream to determine whether a far-end echo is present in the near-end audio stream, a far-end echo corresponding to the recapturing of a playback of the far-end audio stream. Comparing the near-end stream and the far-end stream may comprise comparing a captured near-end audio frame to the far-end audio frame that was being played during the capture of the near-end audio frame. The echo cancellation detection routine 463 may make a determination of whether the playback of the far-end audio frame was captured as part of the near-end audio frame. The echo cancellation detection routine 463 may compare the near-end audio stream and the far-end audio stream to determine whether a far-end audio segment is present in the near-end audio stream.

An echo processing component 360 may comprise an echo cancellation module management routine 467. The echo cancellation module management routine 467 may use an echo-cancellation module at the first client device 325 where a far-end audio segment is present in the near-end audio stream. Using the echo-cancellation module may comprise feeding the near-end audio stream and the far-end audio stream to the echo-cancellation module. The echo cancellation module management routine 467 may activate the echo-cancellation module at the first client device where a far-end audio segment is present in the near-end audio stream and the echo-cancellation module is already inactive. The echo cancellation module management routine 467 may deactivate the echo-cancellation module at the first client device where a far-end audio segment is not present in the near-end audio stream and the echo-cancellation module is already active. The echo cancellation module management routine 467 may deactivate the echo-cancellation module at the first client device where a far-end audio segment has not been detected in the near-end audio stream for a defined period of time.

Using the echo cancellation module may specifically comprise feeding a near-end audio frame and a far-end audio frame to the echo-cancellation module and receiving an echo-cancelled near-end audio frame in return. Where the echo-cancellation module is used, the processed near-end audio frame corresponding to the original near-end audio frame may comprise the echo-cancelled near-end audio frame. Where the echo-cancellation module is not used, the processed near-end audio frame may be the original near-end audio frame passed through the echo processing component 360 without modification. The echo-cancellation module may comprise a software echo-cancellation module, hardware echo-cancellation module, combined software and hardware echo-cancellation module, or any other implementation of an echo-cancellation technique.

The comparison between the near-end audio stream and the far-end audio stream to determine whether a far-end audio segment is present in the near-end audio stream may be performed using a cosine similarity comparison between a plurality of near-end audio segments from the near-end audio stream and a plurality of far-end audio segments from the far-end audio stream. In some embodiments, each of the audio segments may correspond to audio frames used in the transmission of the audio streams, such that the audio content of the near-end audio segments is divided precisely the same as the audio content of the near-end audio frames 390 and the audio content of the far-end audio segments is divided precisely the same as the audio content of the far-end audio frames 380. In other embodiments, the audio segments may be divided distinctly from the audio frames. For example, the audio frames may be sized according to network performance and may, in some embodiments, use dynamically-determined and dynamically-adjusted audio frame sizing based on network performance. In contrast, the audio segments may be of a size determined to improve echo detection.

The echo detection routine 463 may compare each of the plurality of near-end audio segments to each of the plurality of far-end audio segments that contain audio captured prior to capture of the near-end audio segments as those will be the far-end audio segments that contain audio content that might be picked up in the capture of the near-end audio. Various cosine similarity techniques may be used. The cosine similarity comparison may be performed on a frequency domain of the plurality of near-end audio segments and the plurality of far-end audio segments. The echo detection routine 463 may determine the peaks in the frequency domain for each of the audio segments. The echo detection routine 463 may then determine whether any of the near-end audio segments have a sufficient similarity in the peaks of the frequency domain to the far-end audio segments. The frequency domain values may be determined by performing a Fast Fourier Transform (FFT) of the audio segments.

The near-end audio segments and the far-end audio segments may be compared based on a plurality of potential echo delays. Each of the plurality of near-end audio segments may comprise a portion of the near-end audio stream of a predefined length. Each of the plurality of far-end audio segments may comprise a portion of the far-end audio stream of the same predefined length. The echo detection routine 463 may then compare the plurality of near-end audio segments and the plurality of far-end audio segments based on a plurality of echo delays, where each of the plurality of echo delays is a multiple of the predefined length. This may be performed by comparing the near-end audio segments and far-end audio segments in pairs, as the potential echo delays will thereby by multiples of the predefine lengths of the audio segments. It will be appreciated, however, that a delay in the an echo that is not equal to a multiple of the predefined length may still be detected due to the similarity that may still exist between the frequency domains of the audio segments.

The echo detection routine 463 may calculate a plurality of average cosine similarities, wherein each average cosine similarity corresponds to an echo delay of the plurality of echo delays, with the plurality of average cosine similarities calculated over the plurality of near-end audio segments and the plurality of far-end audio segments. The echo detection routine 463 may then determine a highest average cosine similarity of the plurality of average cosine similarities to determine the highest average cosine similarity as a detected echo where the highest average cosine similarity exceeds a predefined threshold. This highest average cosine similarity is associated with a potential echo delay of the plurality of echo delays. This potential echo delay comprises a detected echo delay where the highest average cosine similarity exceeds the predefined threshold. In some embodiments, the echo detection routine may provide the detected echo delay to the echo-cancellation module via the echo cancellation module management routine 467. The echo cancellation module management routine 467 may receive the detected echo delay and configure the echo cancellation module to cancel an echo with the detected echo delay. This may reduce the computational load on the client device of using the echo cancellation module as it no longer needs to determine the echo delay, but is instead provided it.

The echo detection routine 463 may perform the cosine similarity based on audio fingerprints of each of the audio segments. The echo detection routine 463 may generate a plurality of near-end audio fingerprints based on the plurality of near-end audio segments and generate a plurality of far-end audio fingerprints based on the plurality of far-end audio segments. The echo detection routine 463 may then compare the plurality of near-end audio segments and the plurality of far-end audio segments based on the plurality of near-end audio fingerprints and the plurality of far-end audio fingerprints.

Each of the near-end audio fingerprints and far-end audio fingerprints may comprise a high-energy bitmask. A high-energy bitmask represents high-energy portions of a division of audio segments across the frequency domain as single numerical quantity, such as an integer value storing a bitmask. The high-energy portions may comprise audio portions with an energy at least equal to a predefined percentage of a highest energy of any portion of a division of an audio segment across the frequency domain. This predefined percentage may comprise fifty percent, such that the high-energy portions comprise audio portions with an energy at least half of the highest energy of any portion of the division of the audio segment across the frequency domain. The echo detection routine 463 may divide each audio segment across the frequency domain and generate a bitmask wherein each bit of the bitmask is set (i.e., has a value of one) if a corresponding portion of the division has sufficient energy. The number of divisions for each audio segment may be determined based on the word length of the client device, such as using thirty-two divisions to correspond to thirty-bit integers used by the client device.

These audio fingerprints may be used in the performance of the cosine similarity comparison. The echo detection routine 463 may compare the near-end audio stream and the far-end audio stream to determine whether a far-end audio segment is present in the near-end audio stream by performing a cosine similarity comparison between the plurality of near-end audio segments and the plurality of far-end audio segments based on the plurality of near-end audio fingerprints and the plurality of far-end audio fingerprints. The cosine similarity comparison may be performed as a bitwise operation between the plurality of near-end audio fingerprints and the plurality of far-end audio fingerprints, the bitwise operation determining a common number of bits between each compared pair of near-end audio fingerprint and far-end audio fingerprint. This bitwise operation may consist of a bitwise AND operation. The cosine similarity may be determined as a numerical quantity equal to the number of common bits. The echo detection routine 463 may determine that an echo has been detected based on the number of common bits in a pair of near-end audio fingerprint and far-end audio fingerprint exceeding a defined threshold, such as one-half of the bits.

In some embodiments, the echo cancellation module management routine 467 may use the echo-cancellation module at the client device where the far-end audio segment is present in the near-end audio stream based on an averaging of multiple comparisons of the near-end audio stream and the far-end audio stream. Rather than determining whether to activate the echo cancellation module based on a single set of comparisons, the comparisons may instead by iteratively performed and averaged together. For instance, each near-end audio segment may be compared to a defined number of previous far-end audio segments and the highest cosine similarity may be determined. This highest cosine similarity for the comparisons to previous far-end audio segments may be determined for each near-end audio segment generated in turn and these highest cosine similarities combined in a running average. The running average may be a decaying weighted average giving a higher weight to the highest cosine similarity for the more recent audio segments than to the highest cosine similarity for less recent audio segments.

In some embodiments, the near-end audio stream and the far-end audio stream may be continuously compared for an echo until an echo is detected or the audio streaming ends. Where an echo is detected by the echo detection routine 463, the echo cancellation module may be engaged, at which point the echo detection may be terminated to avoid the computational costs of echo detection now that echo cancellation has been activated. In these embodiments, once echo cancellation ahs been activated it may remain active for the duration of the call. In other embodiments, the echo detection routine 463 may compare the near-end audio stream and the far-end audio stream periodically based on a predefined regularity.

In some embodiments, the near-end audio stream and the far-end audio stream may be selectively compared based on the content of the audio streams. For instance, the echo detection routine 463 may compare the near-end audio stream and the far-end audio stream in response to a determination that the near-end audio stream does not contain near-end voice content. Where the near-end user is talking, there should be no echoing possible. The echo detection routine 463 may monitor the near-end audio stream to determine whether it contains voice content and, where it does, refrain from comparing the portion of the near-end audio stream containing voice content and compare the portion of the near-end audio stream that is not detected as containing voice content.

In some embodiments, the audio streams may be selectively compared where both the near-end audio and far-end audio are sufficiently loud as to indicate the possibility of an echo. The near-end audio stream and the far-end audio stream may be selectively compared in response to a determination that the near-end audio stream exceed a near-end audio strength threshold and that the far-end audio stream exceed a far-end audio strength threshold. Alternatively, the near-end audio stream and the far-end audio stream may be selectively compared in response to a determination that a near-end audio stream audio strength exceed a far-end audio stream audio strength.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
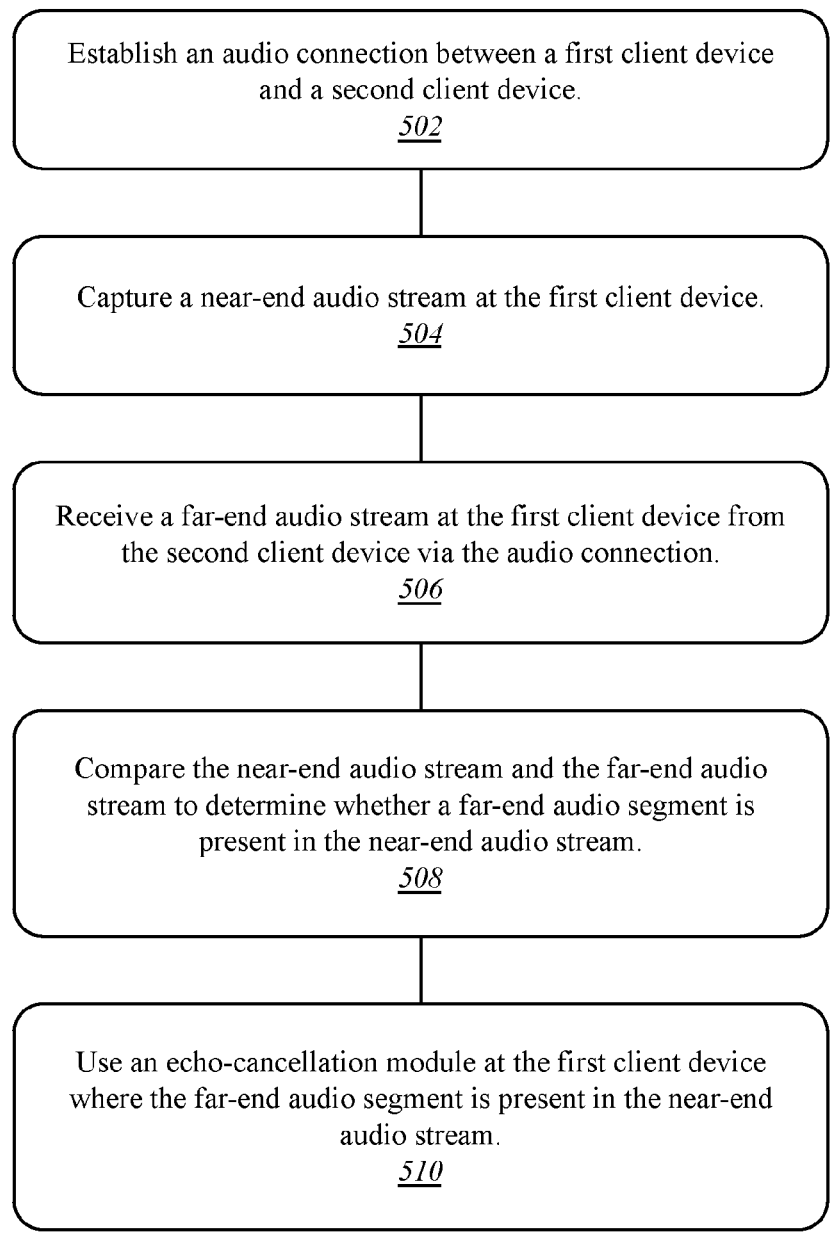
FIG. 5 illustrates an embodiment of a logic flow for the streaming audio system of FIG. 1.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may establish an audio connection between a first client device and a second client device at block 502.

The logic flow 500 may capture a near-end audio stream at the first client device at block 504.

The logic flow 500 may receive a far-end audio stream at the first client device from the second client device via the audio connection at block 506.

The logic flow 500 may compare the near-end audio stream and the far-end audio stream to determine whether a far-end audio segment is present in the near-end audio stream at block 508.

The logic flow 500 may use an echo-cancellation module at the first client device where the far-end audio segment is present in the near-end audio stream at block 510.

The embodiments are not limited to this example.

Figure 6:
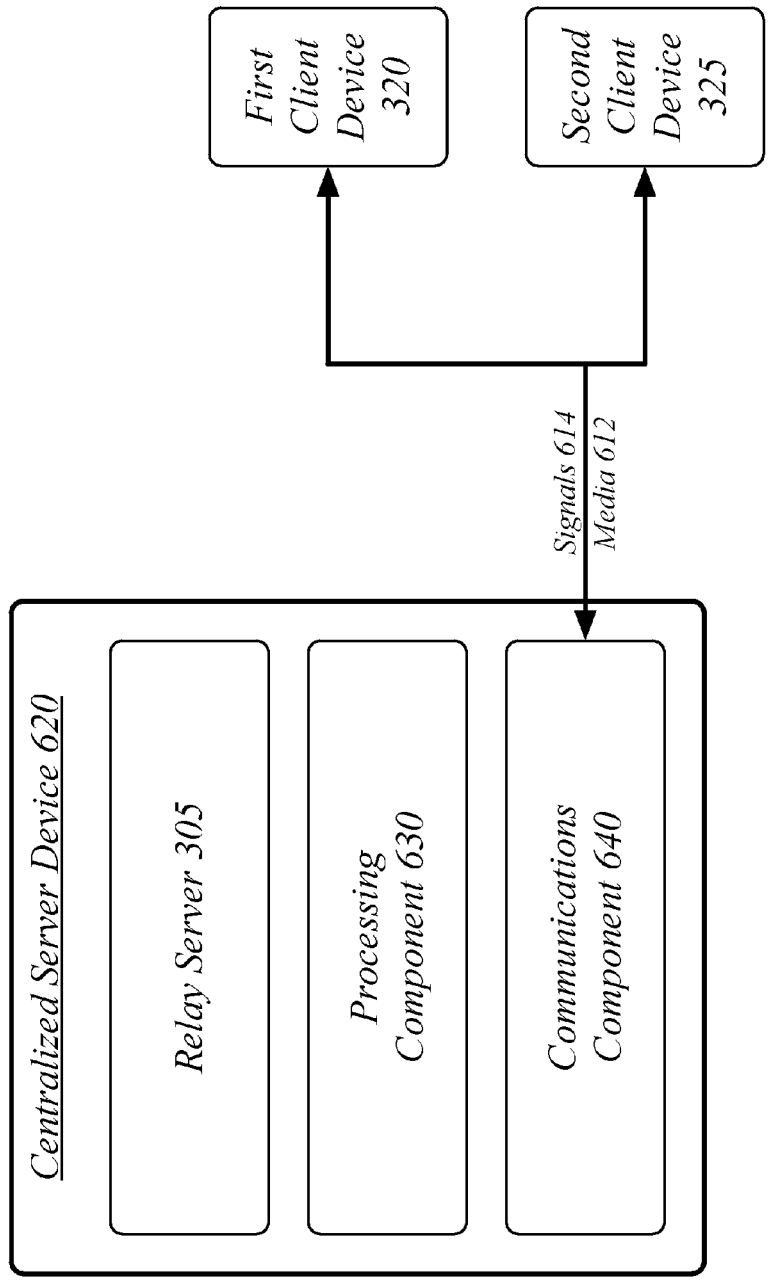
FIG. 6 illustrates an embodiment of a centralized system for the streaming audio system of FIG. 1.

FIG. 6 illustrates a block diagram of a centralized system 600. The centralized system 600 may implement some or all of the structure and/or operations for the streaming audio system 100 in a single computing entity, such as entirely within a single centralized server device 620.

The centralized server device 620 may comprise any electronic device capable of receiving, processing, and sending information for the streaming audio system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the streaming audio system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the streaming audio system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may communicate with other devices over a communications media 612 using communications signals 614 via the communications component 640. The devices may be internal or external to the centralized server device 620 as desired for a given implementation.

The centralized server device 620 may communicate with other devices over a communications media 612 using communications signals 614 via the communications component 640. The centralized server device 620 may execute a relay server 305, the relay server 305 operative to assist in the performance of streaming network connections. The relay server 305 may receive and forward network packets between the first client device 320 and second client device 325 as assistance to the performance of a streaming network connection, the receiving and forwarding of network packets comprising at least a portion of the signals 614 transmitted via media 612.

Figure 7:
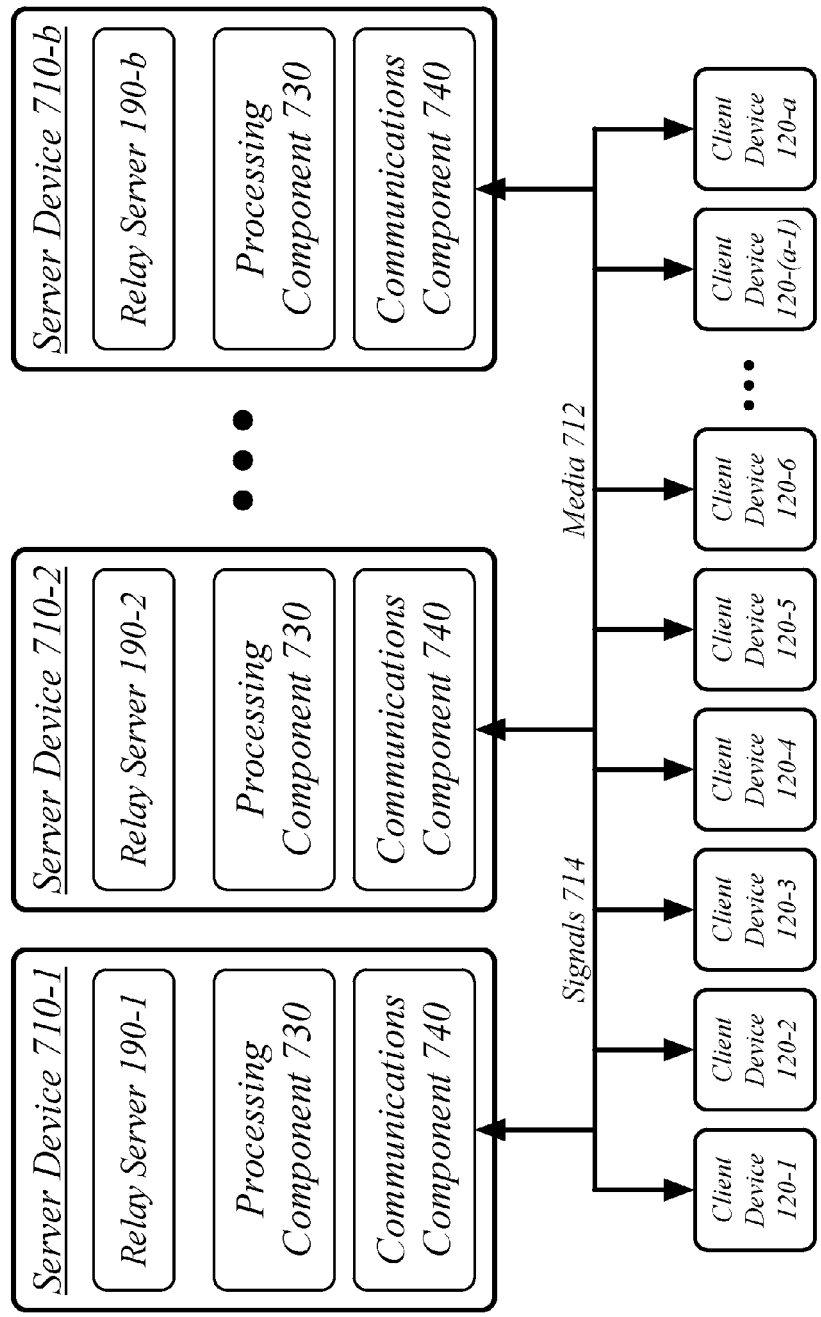
FIG. 7 illustrates an embodiment of a distributed system for the streaming audio system of FIG. 1.

FIG. 7 illustrates a block diagram of a distributed system 700. The distributed system 700 may distribute portions of the structure and/or operations for the streaming audio system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a plurality of server devices 710. In general, the server devices 710 may be the same or similar to the centralized server device 620 as described with reference to FIG. 6. For instance, the server devices 710 may each comprise a processing component 730 and a communications component 740 which are the same or similar to the processing component 630 and the communications component 640, respectively, as described with reference to FIG. 6. In another example, the server devices 710 may communicate over a communications media 712 using communications signals 714 via the communications components 740.

The server devices 710 may comprise or employ one or more programs that operate to perform various methodologies in accordance with the described embodiments. In one embodiment, for example, the server devices 810 may each implement a relay server of a plurality of relay servers 190, as described with reference to FIG. 1.

Figure 8:
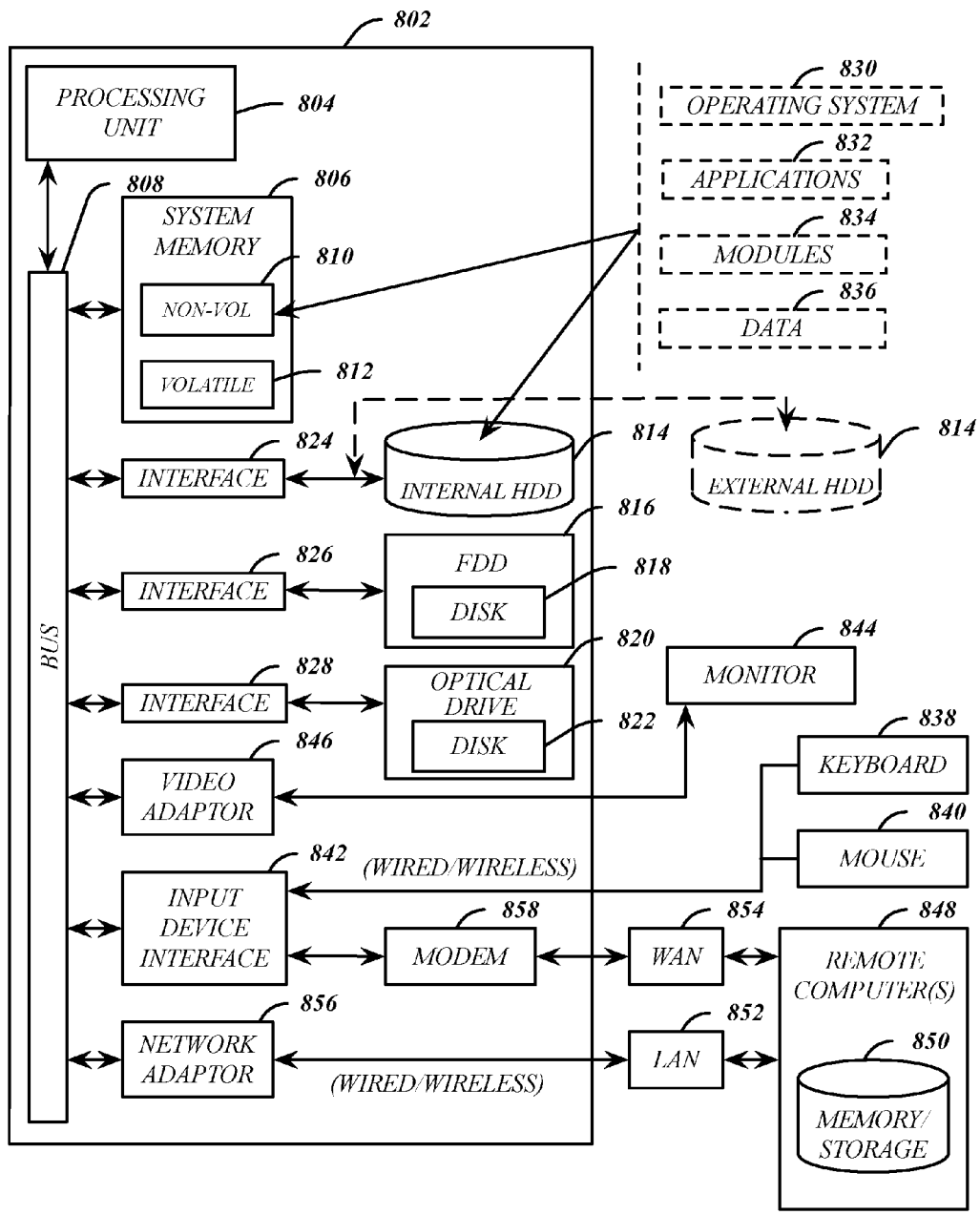
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 3, 6, 7, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel®

Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the streaming audio system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
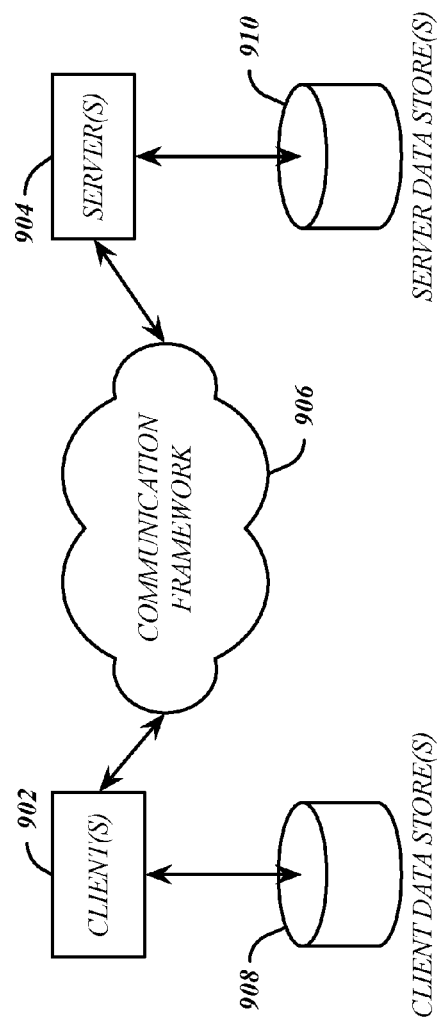
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client devices 120, 320, 325. The servers 904 may implement the server devices 620, 710. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
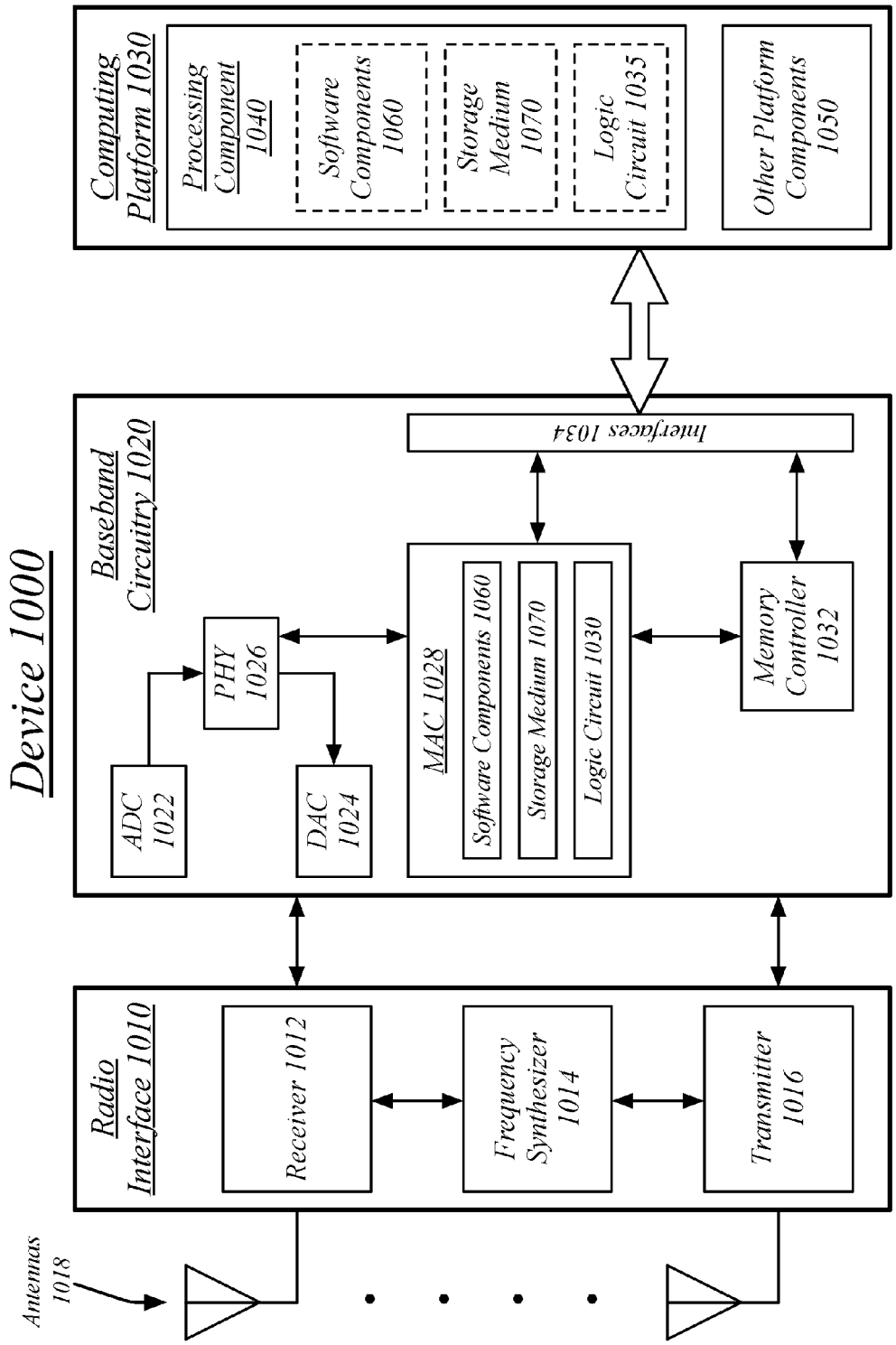
FIG. 10 illustrates an embodiment of a radio device architecture.

FIG. 10 illustrates an embodiment of a device 1000 for use in a multicarrier OFDM system, such as the streaming audio system 100. Device 1000 may implement, for example, software components 1060 as described with reference to streaming audio system 100 and/or a logic circuit 1035. The logic circuit 1035 may include physical circuits to perform operations described for the streaming audio system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the streaming audio system 100 and/or logic circuit 1035 in a single computing entity, such as entirely within a single device. Alternatively, the device 1000 may distribute portions of the structure and/or operations for the streaming audio system 100 and/or logic circuit 1035 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the streaming audio system 100 and logic circuit 1035 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise establishing an audio connection between a first client device and a second client device; capturing a near-end audio stream at the first client device; receiving a far-end audio stream at the first client device from the second client device via the audio connection; comparing the near-end audio stream and the far-end audio stream to determine whether a far-end audio segment is present in the near-end audio stream; and using an echo-cancellation module at the first client device where the far-end audio segment is present in the near-end audio stream.

A computer-implemented method may further comprise the echo-cancellation module comprising one of a software echo-cancellation module and a hardware echo-cancellation module.

A computer-implemented method may further comprise wherein comparing the near-end audio stream and the far-end audio stream to determine whether the far-end audio segment is present in the near-end audio stream comprises a cosine similarity comparison between a plurality of near-end audio segments from the near-end audio stream and a plurality of far-end audio segments from the far-end audio stream.

A computer-implemented method may further comprise the cosine similarity comparison performed on a frequency domain of the plurality of near-end audio segments and the plurality of far-end audio segments.

A computer-implemented method may further comprise wherein comparing the near-end audio stream and the far-end audio stream to determine whether the far-end audio segment is present in the near-end audio stream comprises: capturing a plurality of near-end audio segments, wherein each of the plurality of near-end audio segments comprises a portion of the near-end audio stream of a predefined length; capturing a plurality of far-end audio segments, wherein each of the plurality of far-end audio segments comprises a portion of the far-end audio stream of the predefined length; and comparing the plurality of near-end audio segments and the plurality of far-end audio segments based on a plurality of echo delays, wherein each of the plurality of echo delays is a multiple of the predefined length.

A computer-implemented method may further comprise comparing each of the plurality of near-end audio segments to each of the plurality of far-end audio segments that contain audio captured prior to capture of the near-end audio segments.

A computer-implemented method may further comprise calculating a plurality of average cosine similarities, wherein each average cosine similarity corresponds to an echo delay of the plurality of echo delays, wherein the plurality of average cosine similarities are calculated over the plurality of near-end audio segments and the plurality of far-end audio segments; determining a highest average cosine similarity of the plurality of average cosine similarities; and determining the highest average cosine similarity as a detected echo where the highest average cosine similarity exceeds a predefined threshold.

A computer-implemented method may further comprise the highest average cosine similarity associated with a potential echo delay of the plurality of echo delays, the potential echo delay comprising a detected echo delay where the highest average cosine similarity exceeds the predefined threshold, further comprising: providing the detected echo delay to the echo-cancellation module.

A computer-implemented method may further comprise generating a plurality of near-end audio fingerprints based on the plurality of near-end audio segments; generating a plurality of far-end audio fingerprints based on the plurality of far-end audio segments; and comparing the plurality of near-end audio segments and the plurality of far-end audio segments based on the plurality of near-end audio fingerprints and the plurality of far-end audio fingerprints.

A computer-implemented method may further comprise wherein each of the near-end audio fingerprints and far-end audio fingerprints comprises a high-energy bitmask, wherein the high-energy bitmask represents high-energy portions of a division of audio segments across the frequency domain.

A computer-implemented method may further comprise wherein the high-energy portions comprise audio portions with an energy at least equal to half a highest energy of any portion of a division of an audio segment across the frequency domain.

A computer-implemented method may further comprise wherein comparing the near-end audio stream and the far-end audio stream to determine whether the far-end audio segment is present in the near-end audio stream comprises a cosine similarity comparison between the plurality of near-end audio segments and the plurality of far-end audio segments, wherein the cosine similarity comparison is performed based on the plurality of near-end audio fingerprints and the plurality of far-end audio fingerprints.

A computer-implemented method may further comprise the cosine similarity comparison performed as a bitwise operation between the plurality of near-end audio fingerprints and the plurality of far-end audio fingerprints, the bitwise operation determining a common number of bits.

A computer-implemented method may further comprise the bitwise operation comprising a bitwise AND operation.

A computer-implemented method may further comprise comparing the near-end audio stream and the far-end audio stream periodically based on a predefined regularity.

A computer-implemented method may further comprise comparing the near-end audio stream and the far-end audio stream in response to a determination that the near-end audio stream does not contain near-end voice content.

A computer-implemented method may further comprise comparing the near-end audio stream and the far-end audio stream in response to a determination that the near-end audio stream exceed a near-end audio strength threshold and that the far-end audio stream exceed a far-end audio strength threshold.

A computer-implemented method may further comprise comparing the near-end audio stream and the far-end audio stream in response to a determination that a near-end audio stream audio strength exceed a far-end audio stream audio strength.

A computer-implemented method may further comprise using the echo-cancellation module at the first client device where the far-end audio segment is present in the near-end audio stream based on an averaging of multiple comparisons of the near-end audio stream and the far-end audio stream.

An apparatus may comprise a processor circuit on a first client device; a network interface controller on the first client device; a streaming component operative on the processor circuit to establish a audio connection between the first client device and a second client device via the network interface controller; and receive a far-end audio stream at the first client device from the second client device via the audio connection; an audio capture component operative on the processor circuit capture a near-end audio stream at the first client device; and an echo processing component operative on the processor circuit to compare the near-end audio stream and the far-end audio stream to determine whether a far-end audio segment is present in the near-end audio stream; and use an echo-cancellation module at the first client device where the far-end audio segment is present in the near-end audio stream. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   establishing an audio connection between a first client device and a second client device;
   capturing a near-end audio stream at the first client device;
   receiving a far-end audio stream at the first client device from the second client device via the audio connection;
   comparing the near-end audio stream and the far-end audio stream to determine whether a far-end audio segment is present in the near-end audio stream; and
   using an echo-cancellation module at the first client device where the far-end audio segment is present in the near-end audio stream, and refraining from using the echo-cancellation module at the first client device where the far-end audio segment is not present in the near-end audio stream.

2. The method of claim 1, wherein comparing the near-end audio stream and the far-end audio stream to determine whether the far-end audio segment is present in the near-end audio stream comprises a cosine similarity comparison between a plurality of near-end audio segments from the near-end audio stream and a plurality of far-end audio segments from the far-end audio stream, the cosine similarity comparison performed on a frequency domain of the plurality of near-end audio segments and the plurality of far-end audio segments.

3. The method of claim 1, wherein comparing the near-end audio stream and the far-end audio stream to determine whether the far-end audio segment is present in the near-end audio stream comprises:
   capturing a plurality of near-end audio segments, wherein each of the plurality of near-end audio segments comprises a portion of the near-end audio stream of a predefined length;
   capturing a plurality of far-end audio segments, wherein each of the plurality of far-end audio segments comprises a portion of the far-end audio stream of the predefined length; and
   comparing the plurality of near-end audio segments and the plurality of far-end audio segments based on a plurality of echo delays, wherein each of the plurality of echo delays is a multiple of the predefined length.

4. The method of claim 3, further comprising:
calculating a plurality of average cosine similarities, wherein each average cosine similarity corresponds to an echo delay of the plurality of echo delays, wherein the plurality of average cosine similarities are calculated over the plurality of near-end audio segments and the plurality of far-end audio segments;
determining a highest average cosine similarity of the plurality of average cosine similarities; and
determining the highest average cosine similarity as a detected echo where the highest average cosine similarity exceeds a predefined threshold.

5. The method of claim 3, further comprising:
generating a plurality of near-end audio fingerprints based on the plurality of near-end audio segments;
generating a plurality of far-end audio fingerprints based on the plurality of far-end audio segments; and
comparing the plurality of near-end audio segments and the plurality of far-end audio segments based on the plurality of near-end audio fingerprints and the plurality of far-end audio fingerprints.

6. The method of claim 5, wherein each of the near-end audio fingerprints and far-end audio fingerprints comprises a high-energy bitmask, wherein the high-energy bitmask represents high-energy portions of a division of audio segments across the frequency domain.

7. The method of claim 6, wherein comparing the near-end audio stream and the far-end audio stream to determine whether the far-end audio segment is present in the near-end audio stream comprises a cosine similarity comparison between the plurality of near-end audio segments and the plurality of far-end audio segments, wherein the cosine similarity comparison is performed based on the plurality of near-end audio fingerprints and the plurality of far-end audio fingerprints.

8. The method of claim 7, the cosine similarity comparison performed as a bitwise operation between the plurality of near-end audio fingerprints and the plurality of far-end audio fingerprints, the bitwise operation determining a common number of bits.

9. An apparatus, comprising:
a processor circuit on a first client device;
a network interface controller on the first client device;
a streaming component operative on the processor circuit to establish a audio connection between the first client device and a second client device via the network interface controller; and receive a far-end audio stream at the first client device from the second client device via the audio connection;
an audio capture component operative on the processor circuit capture a near-end audio stream at the first client device; and
an echo processing component operative on the processor circuit to compare the near-end audio stream and the far-end audio stream to determine whether a far-end audio segment is present in the near-end audio stream; and use an echo-cancellation module at the first client device where the far-end audio segment is present in the near-end audio stream, and refrain from using the echo-cancellation module at the first client device where the far-end audio segment is not present in the near-end audio stream.

10. The apparatus of claim 9, wherein comparing the near-end audio stream and the far-end audio stream to determine whether the far-end audio segment is present in the near-end audio stream comprises a cosine similarity comparison between a plurality of near-end audio segments from the near-end audio stream and a plurality of far-end audio segments from the far-end audio stream, the cosine similarity comparison performed on a frequency domain of the plurality of near-end audio segments and the plurality of far-end audio segments.

11. The apparatus of claim 9, wherein the echo processing component is further operative to:
capture a plurality of near-end audio segments, wherein each of the plurality of near-end audio segments comprises a portion of the near-end audio stream of a predefined length;
capture a plurality of far-end audio segments, wherein each of the plurality of far-end audio segments comprises a portion of the far-end audio stream of the predefined length; and
compare the plurality of near-end audio segments and the plurality of far-end audio segments based on a plurality of echo delays, wherein each of the plurality of echo delays is a multiple of the predefined length.

12. The apparatus of claim 11, further comprising:
the echo processing component operative to calculate a plurality of average cosine similarities, wherein each average cosine similarity corresponds to an echo delay of the plurality of echo delays, wherein the plurality of average cosine similarities are calculated over the plurality of near-end audio segments and the plurality of far-end audio segments; determine a highest average cosine similarity of the plurality of average cosine similarities; and determine the highest average cosine similarity as a detected echo where the highest average cosine similarity exceeds a predefined threshold.

13. The apparatus of claim 12, further comprising:
the echo processing component operative to generate a plurality of near-end audio fingerprints based on the plurality of near-end audio segments; generate a plurality of far-end audio fingerprints based on the plurality of far-end audio segments; and compare the plurality of near-end audio segments and the plurality of far-end audio segments based on the plurality of near-end audio fingerprints and the plurality of far-end audio fingerprints.

14. The apparatus of claim 13, wherein each of the near-end audio fingerprints and far-end audio fingerprints comprises a high-energy bitmask, wherein the high-energy bitmask represents high-energy portions of a division of audio segments across the frequency domain, wherein comparing the near-end audio stream and the far-end audio stream to determine whether the far-end audio segment is present in the near-end audio stream comprises a cosine similarity comparison between the plurality of near-end audio segments and the plurality of far-end audio segments, wherein the cosine similarity comparison is performed based on the plurality of near-end audio fingerprints and the plurality of far-end audio fingerprints, the cosine similarity comparison performed as a bitwise operation between the plurality of near-end audio fingerprints and the plurality of far-end audio fingerprints, the bitwise operation determining a common number of bits.

15. At least one non-transitory computer-readable storage medium comprising instructions that, when executed, cause a system to:
establish an audio connection between a first client device and a second client device;
capture a near-end audio stream at the first client device;

receive a far-end audio stream at the first client device from the second client device via the audio connection;

compare the near-end audio stream and the far-end audio stream to determine whether a far-end audio segment is present in the near-end audio stream; and use an echo-cancellation module at the first client device where the far-end audio segment is present in the near-end audio stream, and refrain from using the echo-cancellation module at the first client device where the far-end audio segment is not present in the near-end audio stream.

16. The computer-readable storage medium of claim 15, wherein comparing the near-end audio stream and the far-end audio stream to determine whether the far-end audio segment is present in the near-end audio stream comprises a cosine similarity comparison between a plurality of near-end audio segments from the near-end audio stream and a plurality of far-end audio segments from the far-end audio stream, the cosine similarity comparison performed on a frequency domain of the plurality of near-end audio segments and the plurality of far-end audio segments.

17. The computer-readable storage medium of claim 15, wherein comparing the near-end audio stream and the far-end audio stream to determine whether the far-end audio segment is present in the near-end audio stream comprises further instructions that, when executed, cause a system to capture a plurality of near-end audio segments, wherein each of the plurality of near-end audio segments comprises a portion of the near-end audio stream of a predefined length;

capture a plurality of far-end audio segments, wherein each of the plurality of far-end audio segments comprises a portion of the far-end audio stream of the predefined length; and compare the plurality of near-end audio segments and the plurality of far-end audio segments based on a plurality of echo delays, wherein each of the plurality of echo delays is a multiple of the predefined length.

18. The computer-readable storage medium of claim 17, comprising further instructions that, when executed, cause a system to:

calculate a plurality of average cosine similarities, wherein each average cosine similarity corresponds to an echo delay of the plurality of echo delays, wherein the plurality of average cosine similarities are calculated over the plurality of near-end audio segments and the plurality of far-end audio segments;

determine a highest average cosine similarity of the plurality of average cosine similarities; and determine the highest average cosine similarity as a detected echo where the highest average cosine similarity exceeds a predefined threshold.

19. The computer-readable storage medium of claim 18, comprising further instructions that, when executed, cause a system to:

generate a plurality of near-end audio fingerprints based on the plurality of near-end audio segments;

generate a plurality of far-end audio fingerprints based on the plurality of far-end audio segments; and compare the plurality of near-end audio segments and the plurality of far-end audio segments based on the plurality of near-end audio fingerprints and the plurality of far-end audio fingerprints.

20. The computer-readable storage medium of claim 19, wherein each of the near-end audio fingerprints and far-end audio fingerprints comprises a high-energy bitmask, wherein the high-energy bitmask represents high-energy portions of a division of audio segments across the frequency domain, wherein comparing the near-end audio stream and the far-end audio stream to determine whether the far-end audio segment is present in the near-end audio stream comprises a cosine similarity comparison between the plurality of near-end audio segments and the plurality of far-end audio segments, wherein the cosine similarity comparison is performed based on the plurality of near-end audio fingerprints and the plurality of far-end audio fingerprints, the cosine similarity comparison performed as a bitwise operation between the plurality of near-end audio fingerprints and the plurality of far-end audio fingerprints, the bitwise operation determining a common number of bits.

* * * * *